Patented Aug. 12, 1930

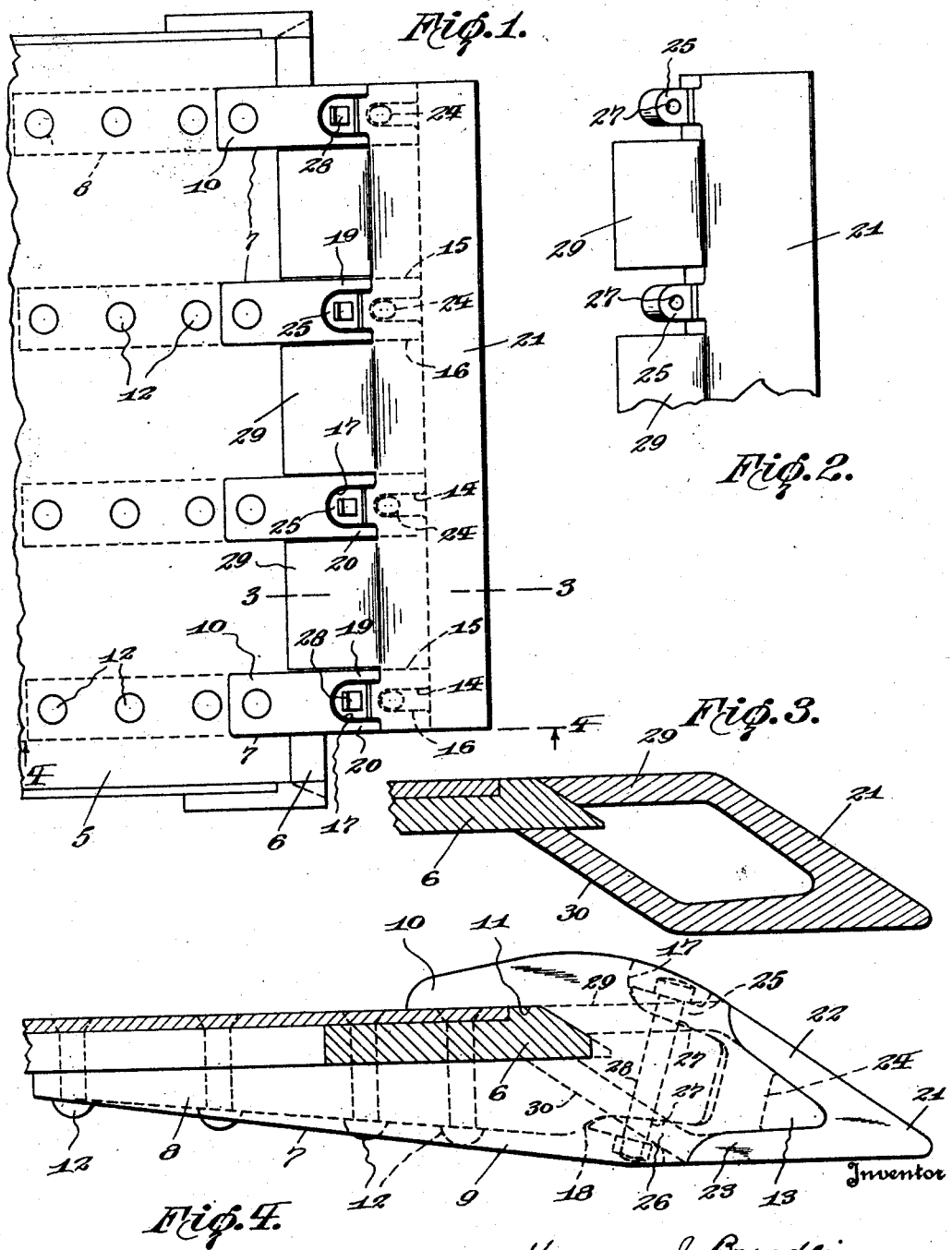

1,772,624

UNITED STATES PATENT OFFICE

HERMAN J. BRENDLIN, OF NEW YORK, N. Y., ASSIGNOR TO THE HAYWARD COMPANY, OF NEW YORK, N. Y., A CORPORATION OF NEW YORK

BUCKET

Application filed June 5, 1928. Serial No. 282,976.

This invention relates generally to scraper buckets and the improvements are directed to a novel cutting edge associated therewith.

Heretofore it has been the practice to provide the lip of a scraper bucket with a series of tooth bases, each base carrying a digging tooth spaced longitudinally along said lip.

In the invention about to be disclosed it is proposed to provide a cutting edge formed from a single piece of material and adapted to be connected with certain tooth bases to extend across the forward longitudinal edge of a bucket.

The invention further contemplates the provision of a cutting edge of the above mentioned character which may be connected to the standard forms of tooth bases and which features the advantages of convenient replacement and reversibility.

As will presently appear said cutting edge is uniquely formed to permit its connection wth the usual tooth bases and adapted to withstand the hard usage attending the operation of a scraper bucket.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Figure 1 is a fragmentary plan view of a scraper bucket embodying my invention.

Fig. 2 is a partial plan view of the cutting edge removed from said bucket.

Fig. 3 is an enlarged sectional view, taken substantially on the line 3—3 of Fig. 1; and Fig. 4 is a similar sectional view, taken on the line 4—4 of Fig. 1.

Referring now in detail to the accompanying drawings, wherein like characters of reference denote similar parts throughout the several views, let 5 denote generally the scraper bucket, said bucket including the lip portion 6, with which latter my improved cutting edge is associated.

As clearly shown in Fig. 1 said lip 6 is provided with a plurality of forwardly directed tooth-bases 7, similar in construction, and including a body portion 8, embodying jaws 9 and 10, having a recess 11 therebetween for the reception of the forward edge of said lip 6, suitable fastening means 12 being employed to position said bases to said lip. The forward portions of each of said bases is tapered to define a nose 13 which is divided by a centrally located recess 14, (see Fig. 1), defining a pair of projections 15 and 16. Extending rearwardly of said nose portion 13 is a pair of recesses 17 and 18, the side walls 19 and 20 of which are shown, as parallel and extending forwardly and terminating adjacent to the rear of the projections 15 and 16 the ends thereof being formed to receive the inner ends of the cutting edge as will presently appear.

The cutting edge 21 comprises jaws 22 and 23, joined by a rib 24 and is adapted to be inserted between the projections 15 and 16, as shown in Fig. 1; ears 25 and 26, being provided for insertion in recesses 17 and 18, each of said ears being apertured as indicated at 27 for the passage of clamping means 28.

The construction just described is similar adjacent the union of the cutting edge with the tooth-bases, and in order to provide a continuous structure I propose to provide webs adapted to fill the gaps between the jaws 9 and 10 of the tooth bases. This construction will be readily understood on inspection of Fig. 3 wherein it will be observed that the webs 29 and 30 abut the lip 6, the top of said web 29 being substantially in the same plane with the upper surface of said lip 6, each of said webs 29 and 30 having their ends angularly disposed and contacting said lip in a manner to permit the reversing of said cutting edge.

On inspection of Fig. 4 it will be noted that said ears 25 and 26 are similar in form and disposed at equal distances from the medial line of said cutting edge and hence this form of structure permits a reversal of said ears when it is desired to arrange a worn bottom surface of the cutting edge inversely to the position shown in the drawings.

From the foregoing it is apparent that in view of the reversibility of my cutting edge, this particular part may give a much longer service and since the webs 29 and 30 extend between the jaws 19 and 20 of the tooth-bases a very substantial and rigid structure is provided.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. A detachable cutting-edge for a scraper-bucket having a lip portion with a plurality of tooth-bases spaced apart, said edge having a plurality of rearwardly directed ears for attachment to said tooth-bases, and also having web portions adapted to fill the spaces between companion tooth-bases.

2. A detachable cutting-edge for a scraper-bucket having a lip portion with a plurality of tooth-bases spaced apart, said edge having a tapered nose portion and a plurality of rearwardly directed ears for attachment to said tooth-bases, and top and bottom web portions adapted to fill the spaces between companion tooth-bases.

3. A detachable and reversible cutting-edge for a scraper-bucket having a lip portion with a plurality of tooth-bases spaced apart, said edge having a plurality of web connected ears for attachment to a plurality of tooth-bases, said edge also being provided with top and bottom web portions adapted to fill the spaces between companion tooth-bases.

4. A detachable and reversible cutting edge for a scraper bucket including a lip portion, said cutting edge being substantially diamond-shaped in cross-section and having rearwardly directed web portions adapted to abut the forward edge of said lip.

5. A detachable and reversible cutting edge for a scraper bucket embodying a lip portion, said edge presenting inclined outer faces to define a cutting edge and having rearwardly inclined web portions adapted to abut the outer portion of a lip, the upper face of one of said web portions being in the same plane with the surface of said lip.

6. A cutting edge for a scraper bucket having a lip portion, said edge being substantially diamond-shaped in cross-section and presenting rearwardly directed web portions cooperating with said lip portion to permit the reversibilty of said cutting edge.

7. A cutting edge comprising an integral structure, said edge including means for attachment to a plurality of tooth bases and having upper and lower web portions filling the spaces between said bases.

8. A cutting edge adapted for attachment to a bucket scraper including tooth-bases, said edge having rearwardly directed, and web-connected ears to permit the attachment of the edge to said tooth bases and having a tapered nose portion and tapering web portions directed rearwardly of the structure and cooperating with the lip portion of a scraper to permit the reversing of said edge.

HERMAN J. BRENDLIN.